United States Patent [19]

de Saint-Palais

[11] 4,165,108
[45] Aug. 21, 1979

[54] DEVICE FOR CONNECTING TUBES HAVING A SMALL CROSS-SECTION PERPENDICULARLY TO A UNIVERSAL COUPLING ELEMENT

[75] Inventor: Jacques de Saint-Palais, Pau, France

[73] Assignee: Societe Nationale Elf Aquitaine (Production), Paris, France

[21] Appl. No.: 868,973

[22] Filed: Jan. 12, 1978

[30] Foreign Application Priority Data

Jan. 14, 1977 [FR] France .................................. 77 01095

[51] Int. Cl.² .............................................. F16L 39/04
[52] U.S. Cl. ...................................... 285/45; 137/615;
137/799; 285/131; 285/137 A
[58] Field of Search ................... 285/131, 132, 137 A,
285/425, 265, 45; 137/615, 799, 236

[56] References Cited

U.S. PATENT DOCUMENTS

| 3,189,098 | 6/1965 | Haeber ......................... 285/137 A X |
| 3,499,484 | 3/1970 | Lanzoni ............................ 285/131 X |
| 4,031,919 | 6/1977 | Ortloff et al. .......................... 137/799 |
| 4,127,145 | 11/1979 | Erlenmayer et al. ............. 137/615 X |

FOREIGN PATENT DOCUMENTS

1019014  1/1977  Canada ...................................... 285/265

*Primary Examiner*—Thomas F. Callaghan
*Attorney, Agent, or Firm*—Brisebois & Kruger

[57] ABSTRACT

A device for connecting two tubes having a small cross-section perpendicular to a universal coupling element which connects to each other a first component and a second component of an articulated marine structure, said tubes are associated respectively to said first and second components, while said universal coupling element is essentially constituted by a solid core provided with four cross-pins the respective axes of which extend in four orthogonal radial directions. Two opposed cross-pins are supported in respective contact zones by bearing surfaces defined by one of said components, while the remaining two opposed cross-pins are supported in respective contact zones by bearing surfaces defined by the other component. This device further comprises two assemblies each at least one tube element in the form of a planar spiral, the number of spiral tube elements of one of said assemblies being equal to the number of spiral tube elements of the other assembly, each one of said spiral tube elements being arranged centrically about the respective axes of two orthogonally disposed cross-pins of said universal coupling element. Each spiral tube element has an inner end connected to the orifice of a conduit provided in the associated cross-pin, any two of the conduits provided in said cross-pins being connected to each other by a respective conduit integral with said core. The spiral tube elements further have each an outer end, the outer end of one spiral tube element being connected to the tube with said first component, while the outer end of the other spiral tube element is connected to the tube associated with the above-mentioned second component.

7 Claims, 6 Drawing Figures

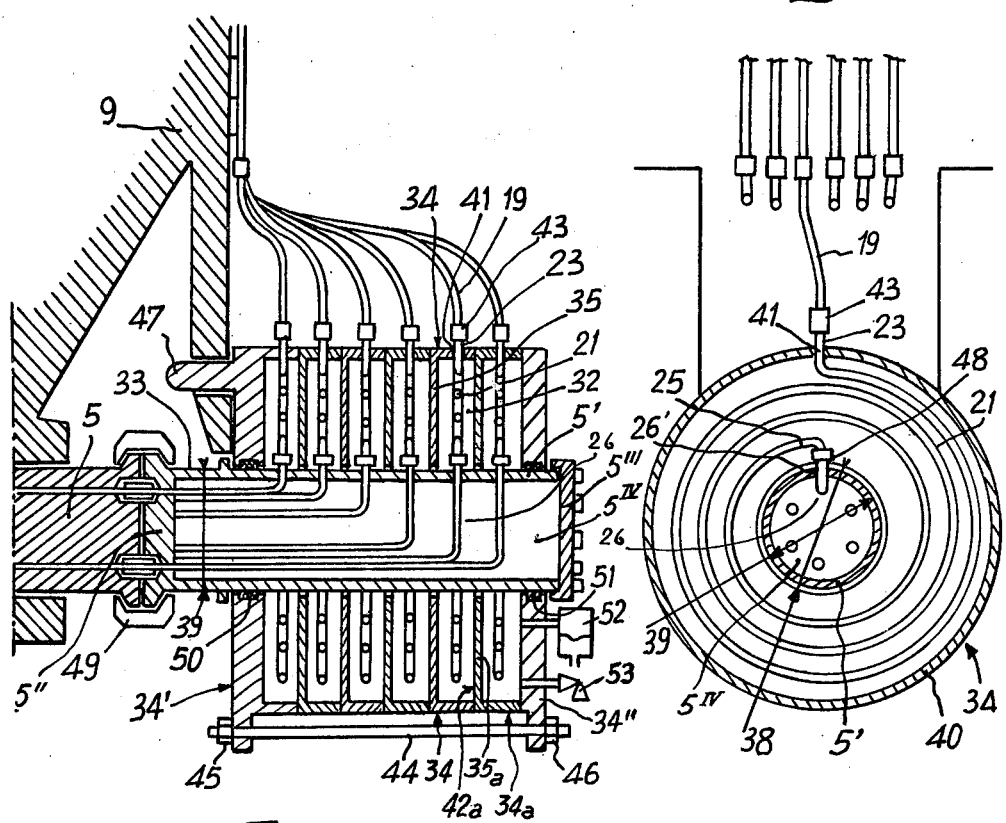
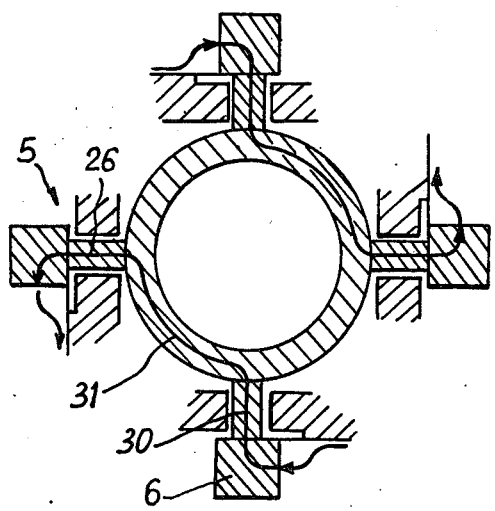

DEVICE FOR CONNECTING TUBES HAVING A SMALL CROSS-SECTION PERPENDICULARLY TO A UNIVERSAL COUPLING ELEMENT

The present invention concerns a device for connecting tubes having a small cross-section perpendicular to a universal coupling element.

A conventional method for realizing such connection, which is necessary for providing flow paths for a plurality of hydraulic remote control circuits, comprises providing flexible tube elements made of plastic material, especially of elastomers, possibly provided with a metallic reinforcement.

These known flexible tube elements are connected, by couplings of a kind known per se, on the one hand to the lower end of a tube connected to an off-shore or similar marine structure, and on the other hand to the upper end of the corresponding tube associated to the base of said structure.

With a view to facilitating the installation of the above-mentioned flexible tubular elements, it is usual practice to use such tubular elements the length of which is substantially larger than the maximum distance between the respective ends of the tubes to be connected to each other, whereby it is possible to keep said tubular elements away from the immediate vicinity of the universal coupling element during the installation or mounting of the assembly.

When the mounting of the marine structure is completed the flexible tubular elements generally sink or collapse so as to rest on the base of the structure, and from this time on there exists a considerable hazard of rupturing or severing of said flexible elements. Such severing may occur as a result of the impact of a metallic element on the base, for example when such metallic element falls down accidentally, or when such metallic elements are manipulated by divers or submarines at various stages of the operation of the related installation.

It is one object of the present invention to eliminate these drawbacks of the known devices for connecting tubes perpendicularly to a universal coupling element, by providing a novel device which comprises steel tube elements arranged in a spiral-like manner about the cross-pins of the universal coupling element, which tube elements exhibit the excellent mechanical properties of the steel, as far as mechanical strength and useful life are concerned, said spiral-shaped steel tubes being so arranged that they are protected against the effects of the accidental dropping of metallic elements.

A universal coupling for connecting a first component of an articulated marine structure to a second component of said structure comprises a universal coupling element constituted by a solid body, or core, having four outer cross-pins arranged by pairs in four orthogonal radial directions, any two diametrically opposed cross-pins resting through respective contact zones on two bearing surfaces defined by members integral with a first component of said marine structure, and on two bearing surfaces defined by members integral with a second component of said structure, respectively.

It is a particular object of the invention to provide a device for connecting two tubes having a small cross-section perpendicularly to a universal coupling element connecting to each other a first component and a second component of an articulated marine structure, which device comprises two assemblies including each at least one tube element in the form of a planar spiral made of elastic material, the number of spiral tube elements of one of said two assemblies being equal to the number of spiral tube elements of the other assembly, each one of said spiral tube elements being arranged centrically about the respective axes of two orthogonally disposed cross-pins of said universal coupling element, each spiral tube element having an inner end connected to the orifice of a conduit provided in the associated cross-pin, any two of the conduits provided in said cross-pins being connected to each other by a respective conduit integral with said core, said spiral tube elements further having each an outer end, the outer end of one spiral tube element being connected to the tube associated with said first component, while the outer end of the outer spiral tube element is connected to the tube associated with said second component of said marine structure.

Another object of the invention is to provide a device of the above defined kind wherein the orifice of every conduit into which opens the inner end of the associated spiral tube element is located, on the associated cross-pin, between a zone of the latter which is engaged with a bearing surface, on the one hand, and said core, on the other hand.

Still another object of the invention is to provide such connecting device wherein the orifice of the conduit into which opens the inner end of the associated spiral tube element is located on the associated cross-pin outside of the contact zones of said cross-pin with the associated bearing surfaces and outside of the area defined between the contact zones of said cross-pin with said bearing surfaces.

Yet another object of the invention is to provide a device of the above-defined kind wherein, with a view to improving the protection of the spiral tube elements and to facilitating dismounting of the device, each spiral tube element is located within an annular space delimited by the outer periphery of a cylindrical extension of the associated cross-pin and by a flange having an annular planar portion delimited by an external circular periphery and an internal circular periphery the diameter of which is slightly larger than the outer diameter of said cylindrical extension of the cross-pin, and a cylindrical portion fixed by one at its ends to the outer circular periphery of said planar annular portion, said cylindrical portion comprising an opening adapted to receive the outer end portion of said spiral tube element which also passes through the next flange, said flanges of a given flange assembly being integral with the same component of said articulated marine structure.

In a preferred embodiment of the present invention the annular spaces in which are located said spiral tube elements communicate with each other and constitute an inner space filled with mineral oil and isolated from the marine environment by an envelope constituted by the cylindrical extension of the cross-pin, a first end plate integral with the first flange, the inner portions of the cylindrical parts of each one of the successive flanges, a second plate, the latter having an aperture for connecting the inner space to the pressure of the outer marine environment, an aperture for connecting the inner space to a safety valve, and at least one aperture for connection with filling and evacuating means.

Depending on the selected embodiment, the conduits integral with the core, which interconnect conduits provided in the orthogonal cross-pins are provided within the body of the core, or mounted in convenient recesses provided in said core.

When it is desired to provide at least one axial conduit passing through the universal joint element, the solid body or core constituting said element is constituted by an annular, or ring-shaped, element.

The invention will be described herein after with reference to the appended drawings, which are given by way of example, but not of limitation.

FIG. 1 schematically shows a connecting device according to the invention.

FIG. 2 retype a spiral tube element.

FIG. 3 shows a connecting device with protection means.

FIG. 4 is a cross-sectional view of the device of FIG. 3.

FIG. 5 is a sectional view of the annular element of a universal coupling.

FIG. 6 shows the protecting flange.

Figure 1:
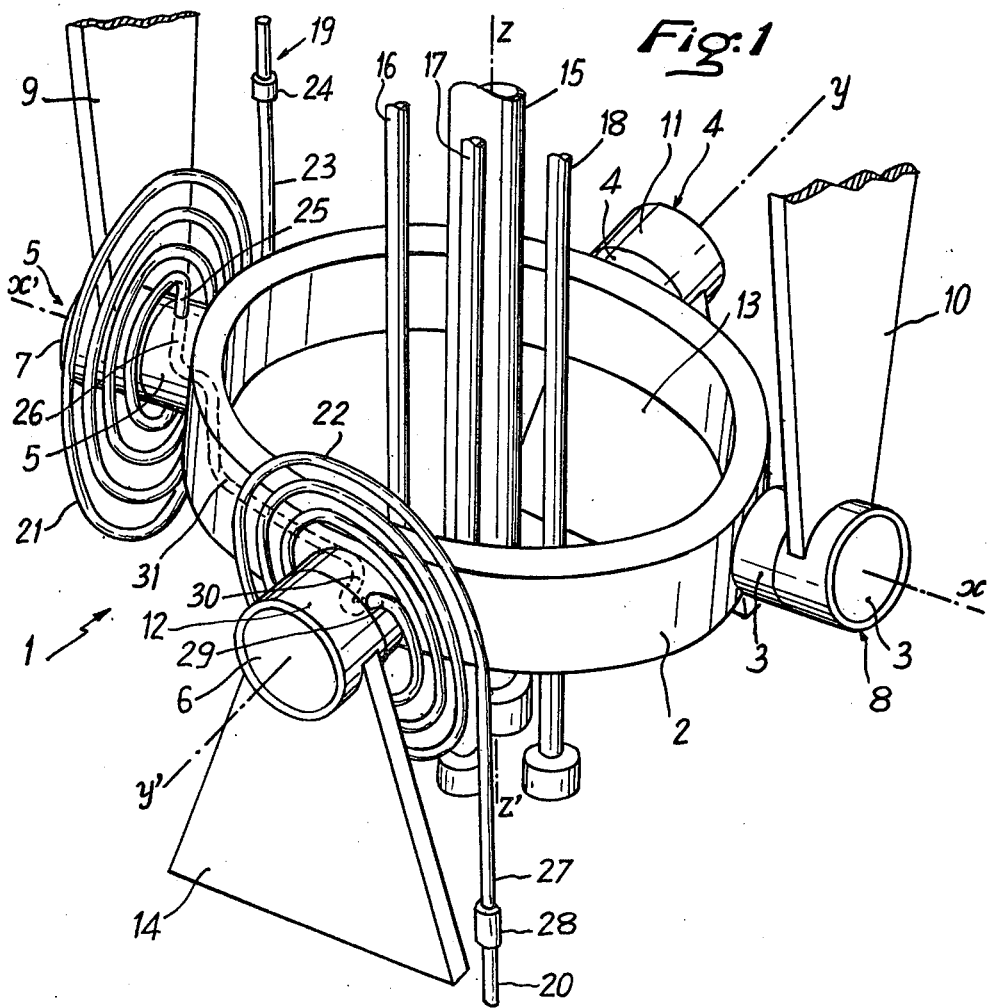

FIG. 1 schematically shows a universal coupling 1 comprising a universal coupling element or core 2 which has an annular shape with an axis of symmetry Z–Z' which, in the embodiment shown, constitutes an axis of revolution. Annular core 2 is provided at its periphery with four outer cross-pins 3, 4, 5, 6 the respective axis x, y, x', y' of which are oriented in four different radial directions, any adjacent two of these axes being orthogonal with respect to each other, in such a manner that axis y–y' is orthogonal to axis x–x'. Two diametrically opposed cross-pins 5, 3 have supporting or bearing surfaces 7, 8 associated with a marine structure (not shown) by means of two supports or bearing members 9, 10 respectively. The bearing surfaces 11, 12 of the two other diametrically opposed cross-pins 4, 6, respectively, are associated to a base (not shown) through two supports or bearing members 13, 14, respectively.

An axial conduit 15 and possibly one or more other excentrically arranged conduits 16, 17, 18, made of steel, such as described in French patent application No. 75 11505 filed on Apr. 14, 1975 by the Applicant extend through the annular core 2.

A tube 19 mounted to the support of a marine structure (not shown) is connected to a tube 20 mounted on the base of said structure (not shown) by means of two tube elements made of steel and having each the shape of a planar spiral, these spiral tube elements being designated in the drawing by numerals 21 and 22.

Spiral tube element 21 is centered about the axis of cross-pin 5 and located between support 9 and annular core 2, in a plane perpendicular to an annular zone wherein cross-pin 5 is exposed, i.e. not covered by bearing surface 7. Such non-covered surface is provided on said cross-pin between the zone thereof which engages the bearing surface, on the one hand, and the annular core, on the other hand, because this zone is more efficiently protected than the outer zones outside of the bearing surfaces, whereby it is possible to omit any protecting casing or the like for said spiral element.

Spiral element 22 is centered about the axis of cross-pin 6 and located between flange 14 and annular core 2 perpendicular to a zone where cross-pin 6 is exposed. This embodiment is preferred as far as spiral tube element 22 is concerned, for the same reasons as those which prevail with reference to spiral tube element 21.

Spiral tube element 21 has an outer end 23 connected to tube 19 by means of a conventional connecting piece 24, and an inner end 25 opening into the orifice of a conduit 26 provided in cross-pin 5.

Spiral tube element 22 has an outer end 27 connected to tube 20 by means of a conventional connecting piece 28, and an inner end 29 opening into the orifice of a conduit 30 provided in cross-pin 6.

Figure 2:
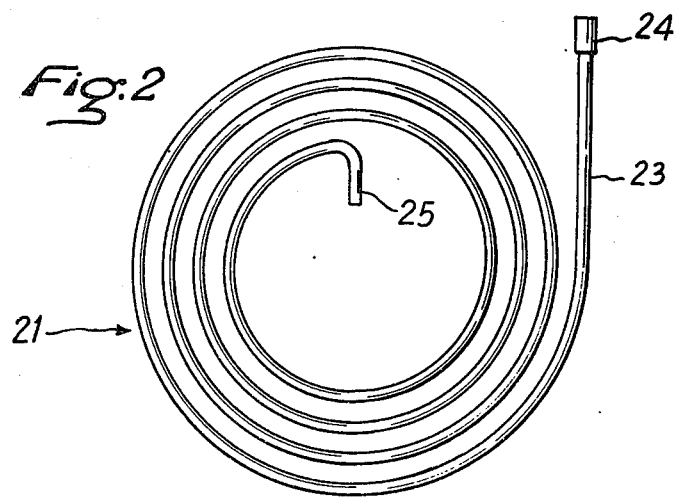

Conduits 26 and 30 provided in cross-pins 5 and 6, respectively, are connected to each other by a conduit 31 integral with annular core 2 and located between the respective footing zones of the two cross-pins 5 and 6 on said core. It is possible to provide a conduit such as 31 within the mass of core 2, or to fix such conduit on the outer surface of the core; however, with a view to improving the safety of the device, it is preferred to fix the conduit 31 in a groove provided on the outer periphery of annular core 2. FIG. 2 shows a spiral tube element such as 21 having an outer end 23 provided with a connecting piece 24, and an inner end 25, as described herein before.

The spiral tube elements such as the one shown in FIG. 2 have a lateral overall dimension equal to the outer diameter of the steel tubes constituting said elements, which outer diameter is generally comprised between 6 and 25 mm. A plurality of spiral tube elements may be mounted side by side on each cross-pin. A casing (not shown) may surround and protect each spiral tube element.

Since it is possible to provide similarly cross-pins 3 and 4 with spiral tube elements, a plurality of tubes having a small cross-section may be connected perpendicularly to the universal coupling element under excellent conditions, as far as safety and workability are concerned.

FIGS. 3, 4, 5 and 6 illustrate the manner in which a connecting device according to the invention may be realized by providing on the cross-pin the orifice of the conduit into which opens the inner end of each spiral tube element, outside of the zones of said cross-pin which engage the bearing surfaces and outside of the area comprised between these zones of engagement, or contact zones.

The connecting device provided with protecting means, as shown in FIG. 3, each spiral tube element is mounted in an annular space 32. Each annular space 32 is delimited by the outer periphery of a cylindrical extension 5' of the cross-pin 5, as well as by a flange 34 including a planar annular portion 35 delimited by an outer circular periphery 36 and an inner circular periphery 37 the diameter 38 of which is slightly larger than the outer diameter 39 of the cylindrical extension 5' of cross-pin 5, said flange further having a cylindrical portion 40 fixed at one end to the outer circular periphery 36 of the above-mentioned planar annular portion 35, said annular space being further delimited by the outer annular surface 42a of the annular planar portion 35a of the adjacent flange 34a.

Flange 34 is integral with one of the two components of the articulated marine structure, which component is represented by support 9. The cylindrical portion 40 of flange 34 comprises an aperture 41 through which the end portion 23 of spiral tube element 21 extends.

Outside of space 32 the outer end 23 of spiral tube element 21 is connected to tube 19 by means of a conventional connecting piece 43.

The flanges such as 34 are integral with the support 9 of the marine structure, to which they are connected by bolts 44 and nuts 45, 46 maintaining the outer flanges 34' and 34", and by means of a driving lug 47, or by any convenient similar means.

The extension 5' of cross-pin 5 may be constituted by a simple extension of the plain cylindrical cross-pin, wherein the conduits such as 26, as described herein above, have to be provided by appropriate machining operations. As shown in FIG. 3 this extension 5' of cross-pin 5 is constituted by a hollow cylinder closed at its end adjacent the cross-pin by a plate provided with a number of openings, the number of said openings being equal to the number of tubes having a small cross-section which are to be installed. Plate 5" is an element of a hydraulic multiconnector provided with mechanical or hydraulic locking means, known per se.

Hollow cylinder 5' is hermetically sealed at its end opposite to plate 5" by means of a plate 5''' bolted by cylinder 5', whereby an inner cylindrical space $5^{IV}$ is delimited.

FIG. 4 shows a section of an annular space, and more particularly shows the section of the cylindrical portion 40 of flange 34, which cylindrical portion comprises the aperture 41 through which the outer end portion 23 of spiral tube element 21 extends.

FIG. 4 shows the inner circular contour, or outline 37, of the planar annular portion of flange 34 the diameter 38 is slightly larger than the outer diameter 39 of the cylindrical extension of cross-pin 5.

The inner end 25 of spiral tube element 21 is connected to an orifice 26' provided on cylindrical extension 5', by means of a connecting piece 48, and hence to a conduit 26 which extends radially into the inner space $5^{IV}$ of extension 5', and then extends in a direction parallel to the axis of said extension 5', so as to open into a conventional hydraulic multiconnector 49.

It will be noted that the two annular spaces 32 communicate with each other, while being sealed with respect to the outer atmosphere by seals 50 and 51.

The end flange 34" is provided with two apertures allowing of mounting, on the one hand, a diaphragm exchanger 52 adapted to separate the oil contained in spaces 32 and the water, with a view to balance the pressure, and on the other hand, a safety valve 53 connecting spaces 32 to the environing water in case of a leakage of the hydraulic circuit 21. The oil bath protects the spiral tube elements against corrosion.

FIG. 5 shows the arrangement of the conduits incorporated in the mass of annular core 2 and cross-pins 3, 4, 5, 6. Planar spiral tube elements 21 and 22 are connected by conduit 26 provided in the cross-pin 5, conduit 31 provided in annular core 2 and conduit 30 provided in cross-pin 6, the other spiral tube elements being connected to each other in a similar manner.

FIG. 6 is a perspective view of a flange 34, showing the various portions described with reference to FIGS. 3 and 4, especially the planar annular portion 35 delimited by an outer circular periphery 36 and an inner circular periphery 37 having a diameter indicated at 38, and a cylindrical portion 40 fixed by one of its ends to the outer periphery 36 of the planar annular portion 35.

Due to the construction described herein above with reference to FIGS. 3, 4, 5 and 6, it is possible to provide an efficiently protected assembly of elements such as 21 which are easily removable, whereby the maintenance and any required repairing operations are considerably facilitated.

A device according to the present invention for connecting tubes having a small cross-section perpendicular to a universal coupling element may be used in cases where a universal joint connects to each other two members of an articulated column, especially a support of a marine structure and a base; it may also be used in cases where a universal joint connects to each other two members of a column, and generally speaking, said device may be used in any case where it is desired to connect to each other two members of a marine structure, whichever their respective functions or relative positions may be.

The invention is not limited to the embodiment described herein above and shown in the drawings. Any person skilled in the art may envisage numerous variants, and modifications while remaining within the scope of the invention as defined in the appended claims.

What is claimed is:

1. A device for connecting two tubes having a small cross-section perpendicularly to a universal coupling element which connects to each other a first component and a second component of an articulated marine structure, said tubes being associated respectively to said first and second structure, said universal coupling element being essentially constituted by a solid core provided with four cross-pins the respective axes of which extend in four respective radial directions any one of which is orthogonal to an adjacent one of said axes, two opposed ones of said cross-pins being supported in respective contact zones by bearing surfaces defined by one of said components of said structure, while the remaining two opposed cross-pins are supported in respective contact zones by bearing surfaces defined by the other component, said device further comprising two assemblies including each at least one tube element in the form of a planar spiral, the number of spiral tube elements of one of said assemblies being equal to the number of spiral tube elements of the other assembly, each one of said spiral tube elements being arranged centrically about the respective axes of two orthogonally disposed cross-pins of said universal coupling element, each spiral tube element having an inner end connected to the orifice of a conduit provided in the associated cross-pin, any two of the conduits provided in said cross-pins being connected to each other by a respective conduit integral with said core, said spiral tube elements further having each an outer end, the outer end of one spiral tube element being connected to the tube with said first component, while the outer end of the other spiral tube element is connected to the tube associated with the second component of said marine structure.

2. The device of claim 1, wherein the orifice of every conduit into which opens the inner end of the associated spiral tube element is located, on the associated cross-pin, between a zone of the latter which engages a bearing surface, on the one hand, and said core, on the other hand.

3. The device of claim 1, wherein the orifice of the conduit into which opens the inner end of the associated spiral tube element is located, on the associated cross-pin, outside of the contact zones of said cross-pin with the associated bearing surfaces, and outside of the area defined between the contact zones of said cross-pin with said bearing surfaces.

4. The device of claim 3, wherein each spiral tube element is located within an annular space delimited by the external periphery of a cylindrical extension of the associated cross-pin and by a flange having an annular planar portion delimited by an external circular periphery and an internal circular periphery the diameter of which is slightly larger than the outer diameter of said cylindrical extension of the cross-pin, and a cylindrical portion fixed by one at its ends to the external circular periphery of said planar annular portion, said cylindrical portion comprising an opening adapted to receive the outer end portion of said spiral tube element which also passes through the next flange, said flanges of a given flange assembly being integral with the same component of said articulated marine structure.

5. The device of claim 4, wherein the annular spaces in which are located said spiral tube elements communicate with each other and constitute an inner space filled with mineral oil and isolated from the marine environment by an envelope constituted by the cylindrical extension of the cross-pin, a first end plate integral with the first flange, the inner portions of the cylindrical parts of each one of the successive flanges, and a second plate, the latter having an aperture for connecting the inner space to the pressure of the external marine environment, an aperture for connecting the inner space to a safety valve, and at least one aperture for connection with filling and evacuating means.

6. The device of claim 1, wherein the conduits integral with said annular core, which connect conduits provided respectively in corresponding orthogonal cross-pins, are provided within the mass of said core.

7. The device of claim 1, wherein said core is constituted by a circular annular element.

* * * * *